US009387723B2

(12) United States Patent
Beatty (10) Patent No.: US 9,387,723 B2
(45) Date of Patent: Jul. 12, 2016

(54) SWIVEL LOCK FOR A CASTER

(71) Applicant: Shepherd Caster, LLC, St. Joseph, MI (US)

(72) Inventor: David Paul Beatty, Stevensville, MI (US)

(73) Assignee: SHEPHERD CASTER LLC, St. Joseph, MI (US)

( * ) Notice: Subject to any disclaimer, the term of this patent is extended or adjusted under 35 U.S.C. 154(b) by 0 days.

(21) Appl. No.: 14/317,839

(22) Filed: Jun. 27, 2014

(65) Prior Publication Data

US 2015/0375565 A1 Dec. 31, 2015

(51) Int. Cl.
*B60B 33/00* (2006.01)
*B60B 33/02* (2006.01)

(52) U.S. Cl.
CPC ........... *B60B 33/021* (2013.01); *B60B 33/0086* (2013.01); *B60B 33/025* (2013.01)

(58) Field of Classification Search
CPC .... B60B 33/02; B60B 33/025; B60B 33/028; B60B 33/006; B60B 33/0065; B60B 33/0068; B60B 33/0076; B60B 33/0042; B60B 33/0086; B60B 33/021
See application file for complete search history.

(56) References Cited

U.S. PATENT DOCUMENTS

| 2,728,936 | A | | 1/1956 | Hodges et al. |
| 3,890,669 | A | | 6/1975 | Reinhards |
| 3,911,525 | A | | 10/1975 | Haussels |
| 4,677,706 | A | * | 7/1987 | Screen .......................... 16/35 R |
| 5,242,035 | A | | 9/1993 | Lange |
| 5,303,450 | A | * | 4/1994 | Lange ............................ 16/35 D |
| 5,377,372 | A | | 1/1995 | Rudolf et al. |
| 5,503,416 | A | * | 4/1996 | Aoki et al. .................. 280/79.11 |
| 6,532,624 | B1 | * | 3/2003 | Yang .............................. 16/35 R |
| 6,584,641 | B1 | * | 7/2003 | Milbredt ....................... 16/35 R |
| 6,834,746 | B1 | * | 12/2004 | Lin ............................... 188/1.12 |
| 8,499,413 | B1 | | 8/2013 | Tsai |
| 2004/0003482 | A1 | | 1/2004 | Schreiber et al. |
| 2007/0056141 | A1 | * | 3/2007 | Armano et al. ............... 16/35 R |
| 2007/0119661 | A1 | * | 5/2007 | Chang .......................... 188/1.12 |

(Continued)

FOREIGN PATENT DOCUMENTS

| DE | 4445697 A1 | 6/1996 |
| DE | 202013103770 U1 | 9/2013 |
| GB | 2457787 A | 9/2009 |

OTHER PUBLICATIONS

Espacenet English translation of Abstract of DE 4445697.

(Continued)

*Primary Examiner* — Emily Morgan
(74) *Attorney, Agent, or Firm* — Thompson Coburn LLP (57) ABSTRACT

A caster comprises a body including a stem cavity with a stem of the caster rotatably mounted in the stem cavity to permit rotation of the stem relative to the body about a stem access. The stem may comprise a spline shaft extending from the stem into the stem cavity. The stem and spline shaft are operatively connected. The stem cavity may have a spline bushing. The spline bushing and the body are operatively connected to each other. The spline shaft and the spline bushing are releasbeably interlockable. One of the spline bushing and the spline shaft may be movable in a direction along the stem axis between the swivel position wherein the spline shaft is not engaged with the spline bushing, and a fixed position wherein the spline shaft is engaged with the spline bushing.

6 Claims, 7 Drawing Sheets

(56) References Cited

U.S. PATENT DOCUMENTS

| | | | | |
|---|---|---|---|---|
| 2008/0115324 | A1* | 5/2008 | Block et al. | 16/35 R |
| 2010/0077562 | A1* | 4/2010 | Block et al. | 16/46 |
| 2011/0083298 | A1* | 4/2011 | Yan | 16/31 R |
| 2012/0054983 | A1 | 3/2012 | Steenson | |
| 2012/0255141 | A1* | 10/2012 | Lin et al. | 16/45 |
| 2012/0317752 | A1* | 12/2012 | Dayt | 16/35 R |

OTHER PUBLICATIONS

English Translation of DE202013103770, Tsai Chuan, "Controllable Swivel Roller with double Braking Action" published on Nov. 7, 2013, pp. 1-9.
International Search Report, International Patent Application No. PCT/US2015/037081, mailed Sep. 14, 2015, 10 pages.

* cited by examiner

SWIVEL LOCK FOR A CASTER

BACKGROUND AND SUMMARY

The disclosure relates to a swivel lock for a caster. In particular, the swivel lock may be configured to be actuated by a brake lever of the caster. The swivel lock comprises a male spline shaft and a female spline bushing which are releasably interlockable to prevent rotation of the caster about a swivel axis.

DETAILED DESCRIPTION

The caster 20 has a body 22 which serves as a frame for the components of the caster. The caster 20 has first and second wheels 24,26 that rotate about a wheel axis 28. The body 22 may have a portion 30 extending generally perpendicular to the wheel axis 28. The perpendicular extending portion 30 may have a stem cavity 32 that receives a stem 34 of the caster. The stem 34 rotates relative to the body 22 along a stem or swivel axis 36. The stem or swivel axis 36 is generally perpendicular to the wheel axis 28. The caster 20 may have a leading brake lever 38 generally adjacent to perpendicular extending portion 30 of the body 22, and a trailing brake lever 40 on the opposite side of the body. In the drawings, a two-wheeled caster is shown. In such a configuration, the leading brake lever 38 may be configured to prevent rotation of one wheel 26, and the trailing brake lever 40 may be configured to prevent rotation of the opposite wheel 24. The wheels 24,26 may be rotatably coupled to the body 22 with an axle 42.

Figure 1:
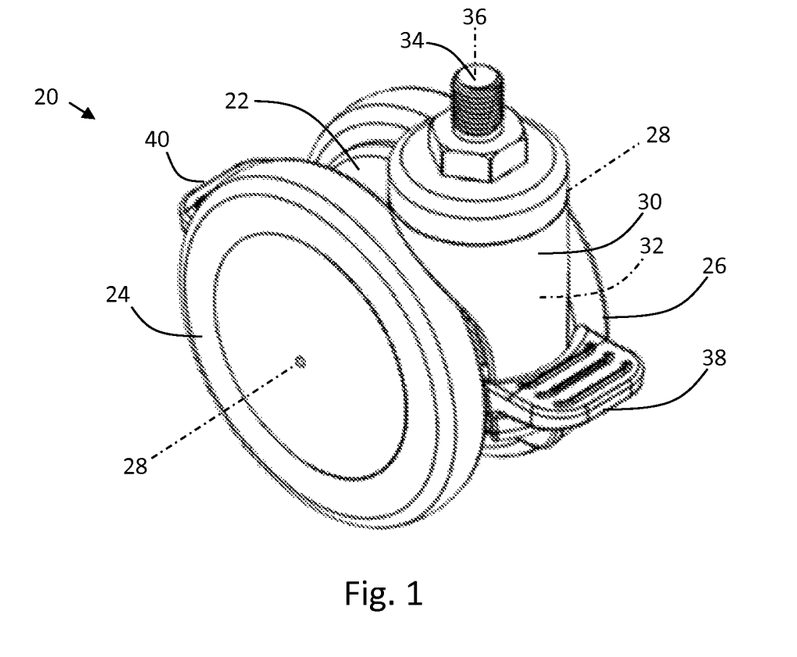
FIG. 1 shows a perspective view of a caster with a swivel lock as described herein.
Figure 2:
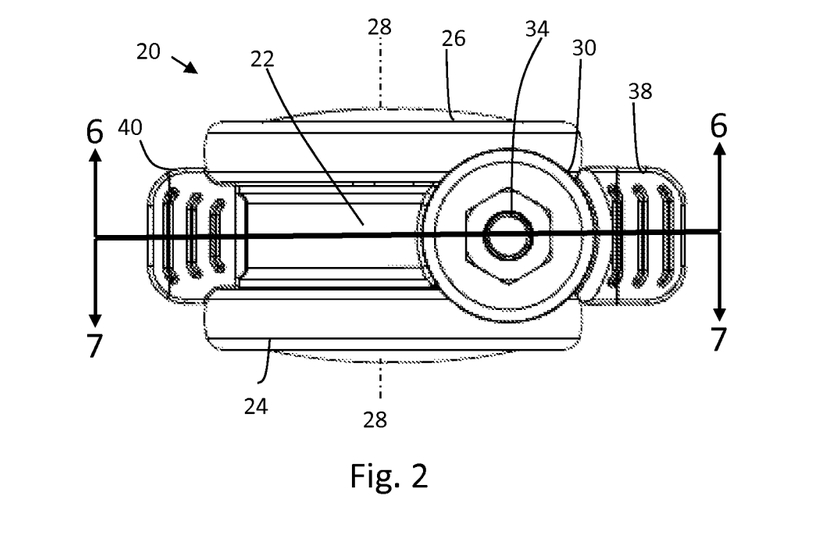
FIG. 2 shows a top view of the caster of FIG. 1.
Figure 3:
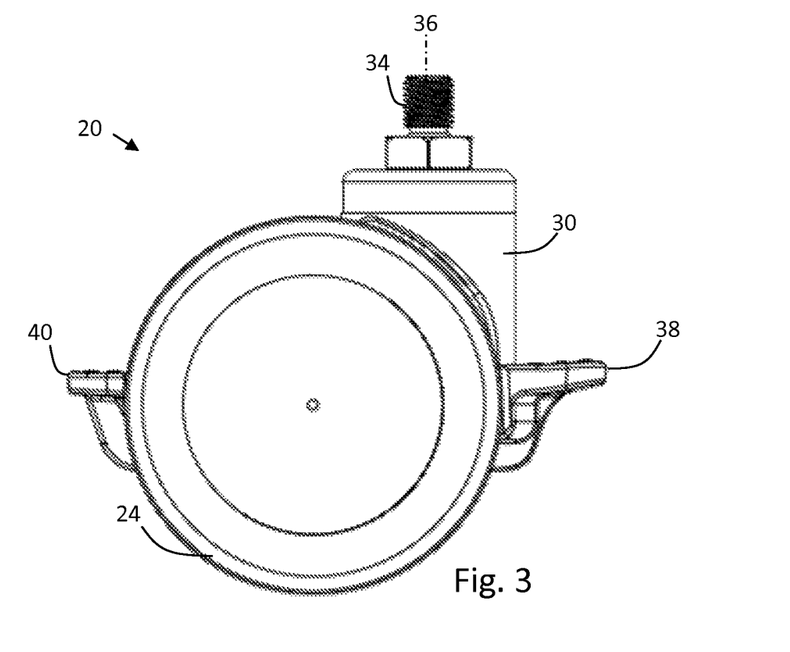
FIG. 3 is a front view of the caster of FIG. 1.
Figure 4:
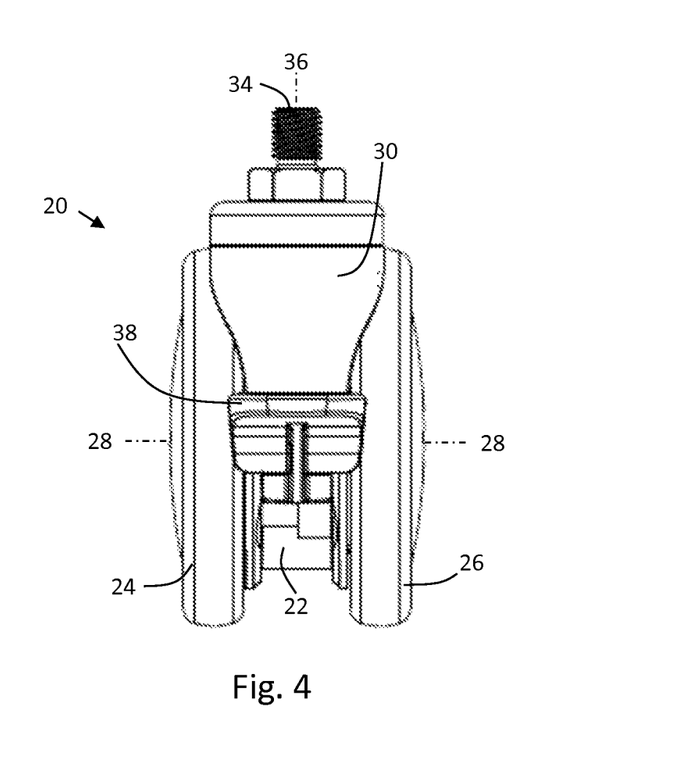
FIG. 4 is a right side view of the caster of FIG. 3.
Figure 5:
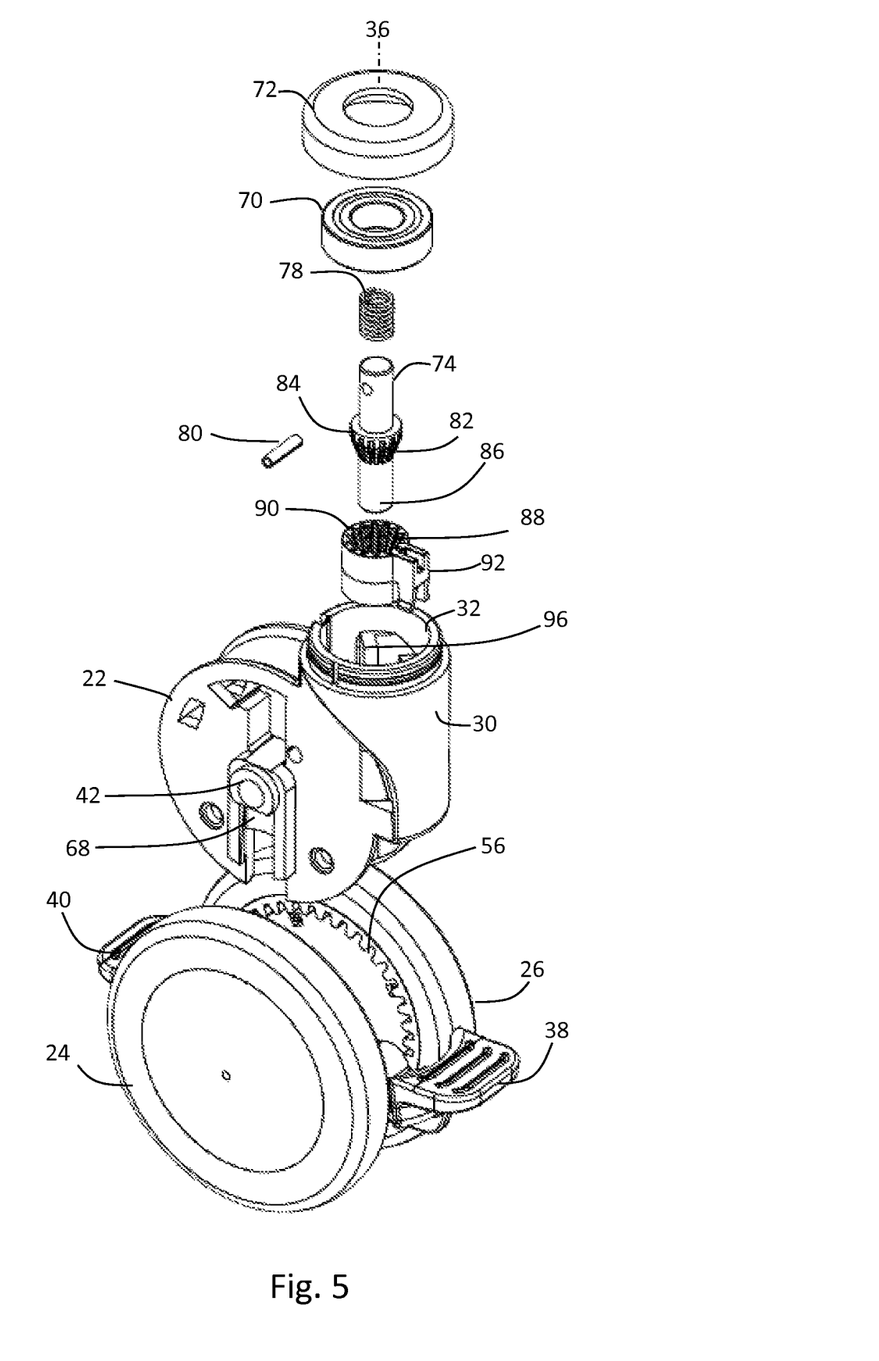
FIG. 5 is an exploded view of the caster of FIG. 1.
Figure 6:
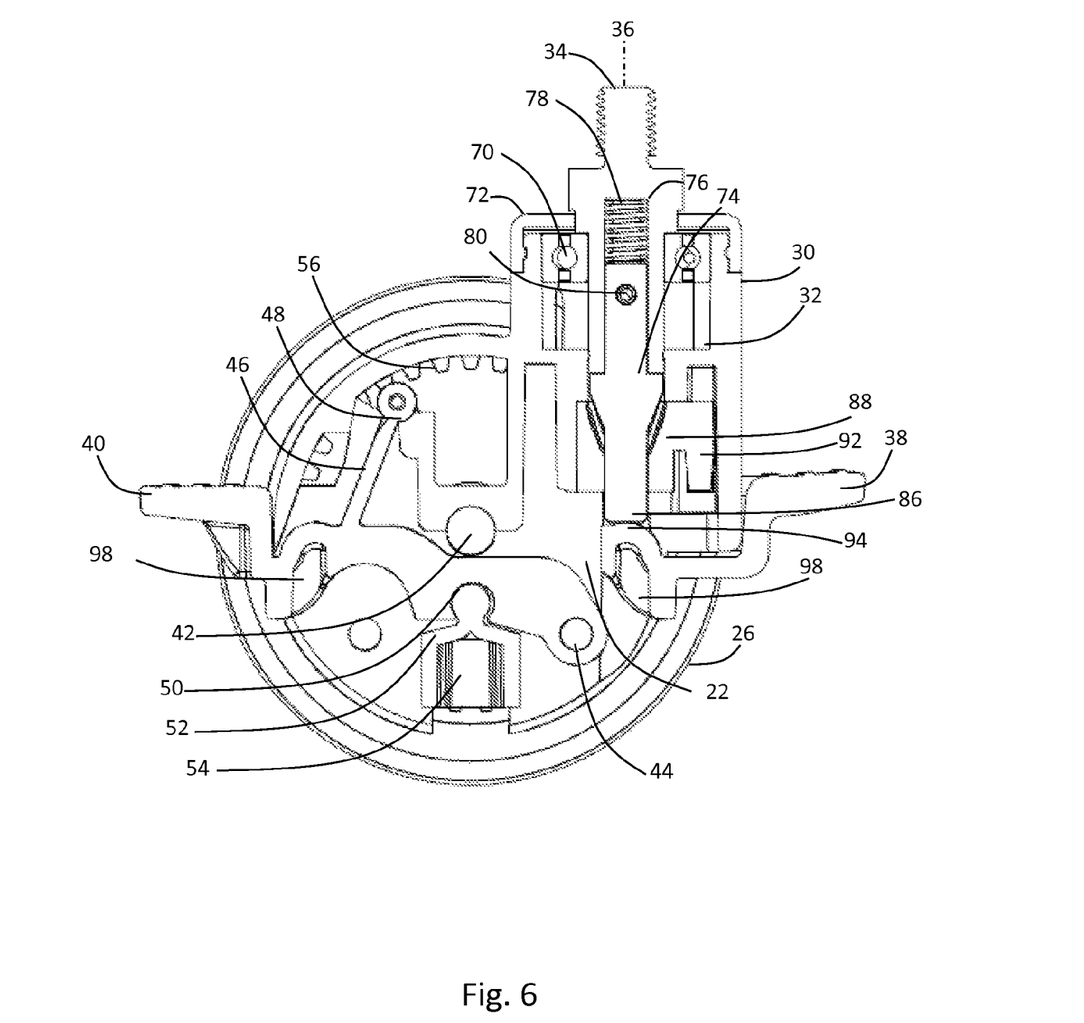
FIG. 6 is a cross-sectional view taken along lines 6-6 of FIG. 2.

As best shown in FIG. 6, the trailing brake lever 40 may be pivotally connected with the body with a pivot pin 44. The trailing brake lever 40 may have a finger 46 extending from the lever that engages one or more detents 48 in the body to maintain the lever in a desired position. The body 22 may be provided with the detent 48 to fix the position of the trailing brake lever 40 in the unlocked position. The finger 46 of the trailing brake lever 40 may cooperate with the detent 48 and may have a curved distal end to allow the finger 46 to slide and transition into and out of the detent 48. The trailing brake lever 40 may have a notch 50, and a lock block 52 may be coupled to the trailing brake lever at the notch. The lock block 52 may be configured to slide (for instance, vertically as shown in FIG. 6) within the body 22. The lock block 52 may be coupled to a wheel teeth lock 54. The wheel teeth lock 54 may move within the body (for instance, vertically as shown in FIG. 6) to engage wheel teeth 56 formed on an inner diameter surface of the wheel 26. The assembly of the lock block 52 and the wheel teeth lock 54 may be biased away from the wheel teeth 56 by a spring (not shown).

The trailing brake lever 40 may be rotated between an unlocked position in which the lock block 52 lifts the wheel teeth lock 54 upward out of engagement with the wheel teeth 56 to allow rotation of the wheel 26 about the body 22, and a locked position in which the lock block forces the wheel teeth lock downward into engagement with the wheel teeth to prevent rotation of the wheel about the body. FIG. 6 show the trailing brake lever 40 in an unlocked position. Making reference to FIG. 6, to position the trailing brake lever 40 to the locked position, the brake lever may be pivoted counterclockwise to drive the lock block 52 and the wheel teeth lock 54 downward. Downward force on the trailing brake lever 40 causes the lever to pivot about its pivot pin 44, releasing the finger 46 from the detent 48. The downward motion of the lever also moves the lock block 52 downward and drives the wheel teeth lock 54 against the wheel teeth 56 thereby preventing rotation of the wheel 26 about the wheel axis 28. To re-position the trailing brake lever 40 to the un-locked position, the brake lever may be pivoted clockwise to raise the assembly of the lock block 52 and the wheel teeth lock 54 and release the wheel teeth lock from the wheel teeth 56 thereby allowing rotation of the wheel 26 about the wheel axis 28.

Figure 7:
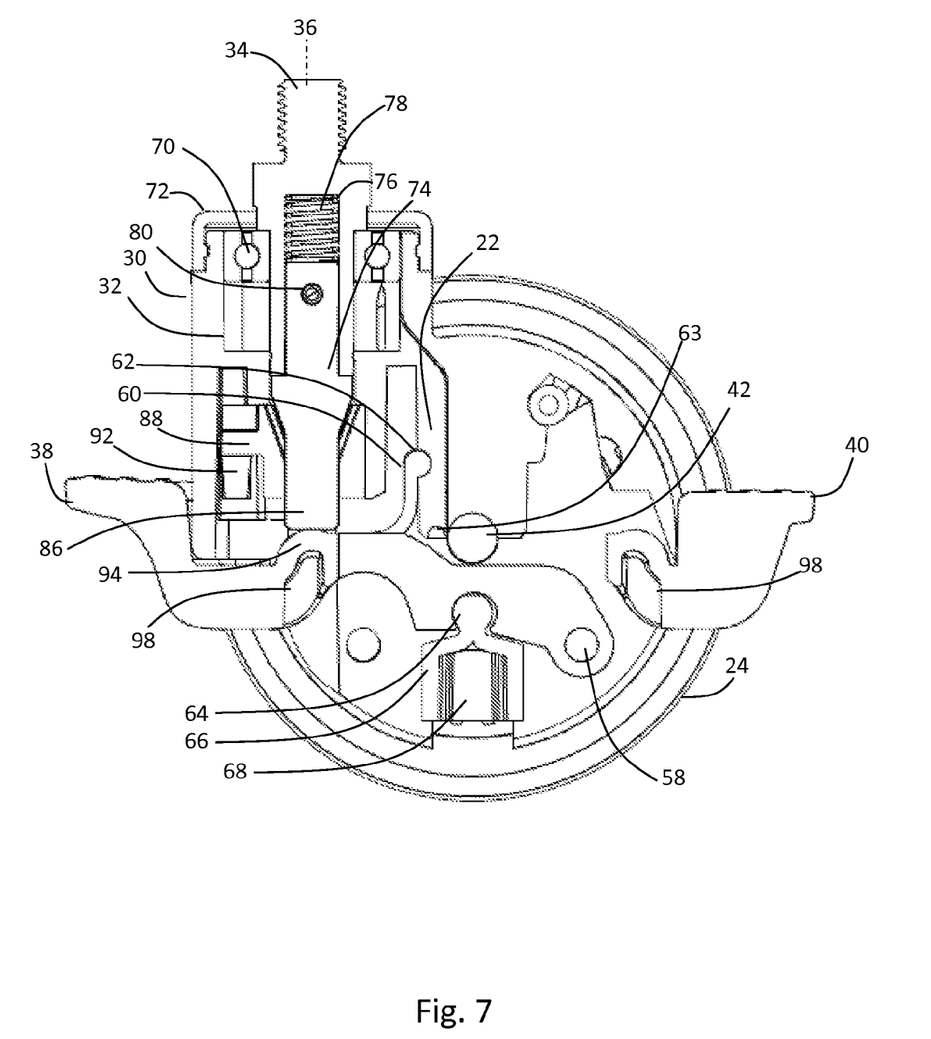
FIG. 7 is a cross-sectional view taken along lines 7-7 of FIG. 2.
Figure 8:
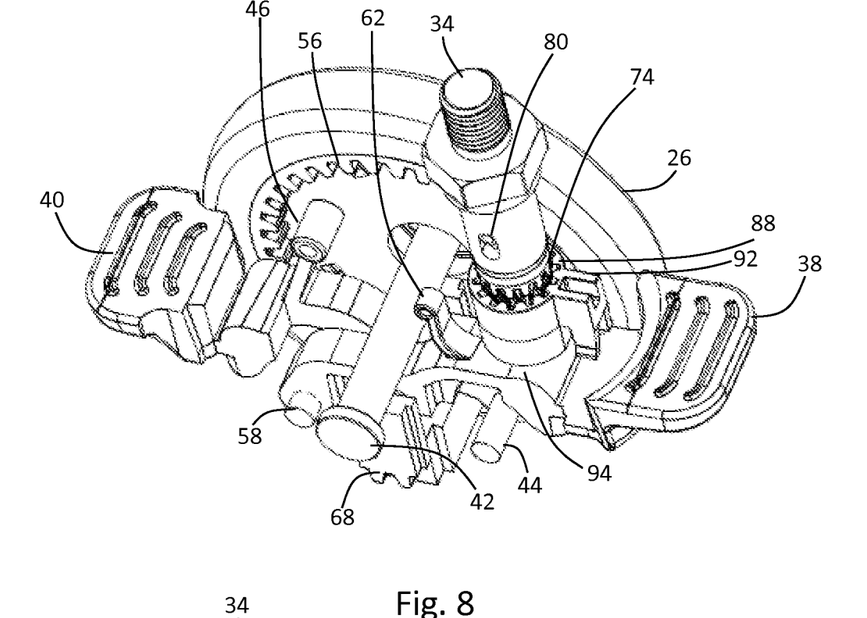
FIGS. 8-9 are perspective views of the caster of FIG. 1 with a body and wheels of the caster removed to provide additional detail of one embodiment of the swivel lock.
Figure 9:
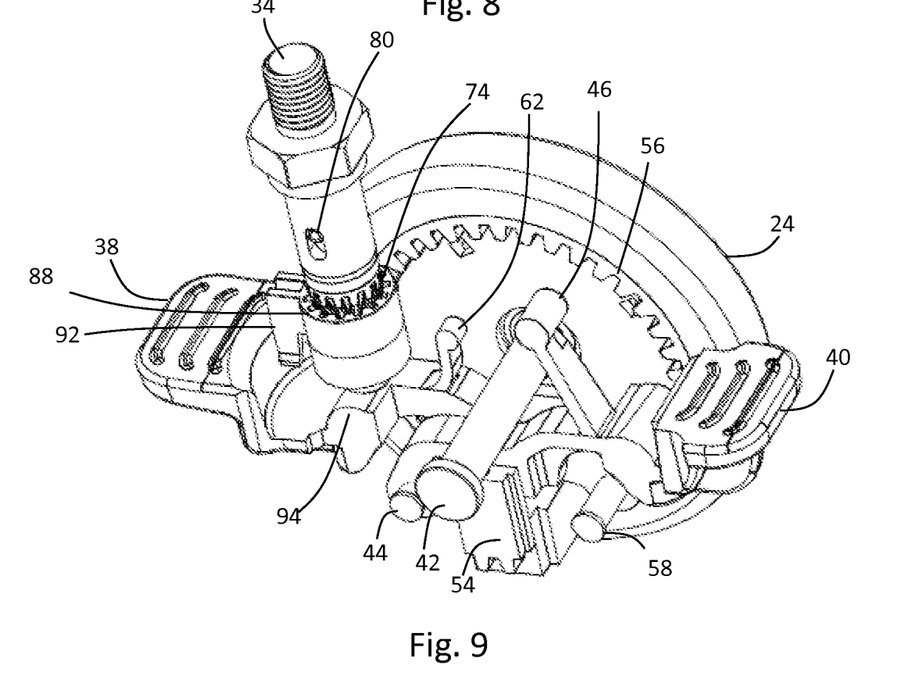
Figure 10:
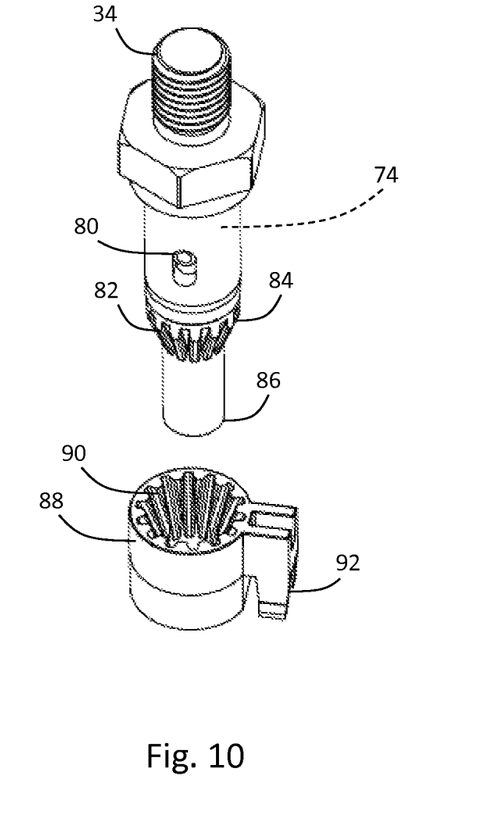
FIG. 10 is a perspective view of an embodiment of a stem assembly and a spline bushing comprising the swivel lock described herein.

Making reference to FIG. 7, the leading brake lever 38 has a similar configuration. The leading brake lever 38 may be pivotally connected with the body with a pivot pin 58. The leading brake lever 38 may have a finger 60 extending from the lever that engages detents 62,63 in the body to maintain the lever in a desired position. The body 22 may be provided with the detents 62,63 to fix the position of the leading brake lever in the locked and unlocked positions, respectively. The finger 60 of the leading brake lever may cooperate with the detents 62,63 and may have a curved distal end to allow the finger to slide and transition into and out of the detents. The leading brake lever 38 may have a notch 64, and a lock block 66 may be coupled to the leading brake lever at the notch. The lock block 66 may be configured to slide (for instance, vertically as shown in FIG. 7) within the body 22. The lock block 66 may be coupled to a wheel teeth lock 68. The wheel teeth lock 68 may move within the body 22 (for instance, vertically as shown in FIG. 6) to engage wheel teeth 56 formed on an inner diameter surface of the wheel 24. The assembly of the lock block 66 and wheel teeth lock 68 may be biased away from the wheel teeth 56 by a spring (not shown).

The leading brake lever 38 may be rotated between an unlocked position in which the lock block 66 lifts the wheel teeth lock 68 upward out of engagement with the wheel teeth 56 to allow rotation of the wheel 24 about the body 22, and a locked position in which the lock block forces the wheel teeth lock downward into engagement with the wheel teeth to prevent rotation of the wheel about the body. FIG. 7 show the leading brake lever 38 in an unlocked position. Making reference to FIG. 7, to position the leading brake lever 38 to the locked position, the leading brake lever 38 may be pivoted counterclockwise to drive the lock block 66 and the wheel teeth lock 68 downward. Downward force on the leading brake lever causes the lever to pivot about its pivot pin 58 releasing the finger 60 from the detent 62. The downward motion of the lock block 66 also drives the wheel teeth lock 68 against the wheel teeth 56 thereby preventing rotation of the wheel 24 about the wheel axis 28. To re-position the leading brake lever 38 to the un-locked position, the brake lever may be pivoted clockwise to raise the assembly of the lock block 66 and the wheel teeth lock 68 and release the wheel teeth lock from the wheel teeth 56 thereby allowing rotation of the wheel 24 about the wheel axis 28.

The stem 34 is rotatably mounted in the stem cavity 32 to permit rotation of the stem relative to the body about the stem axis 36. A bearing 70 may be provided to facilitate rotation of the stem 34 in the stem cavity 32. The bearing 70 and stem 34 may be retained in the stem cavity with a stem cap 72. Once installed in the application, weight applied downward to the stem 34 may also facilitate engagement of the stem and the bearing 70 in the stem cavity 32. The stem 34 may comprise a spline shaft 74. The spline shaft 74 may be disposed within a hollow interior 76 formed within the stem. A spring 78 may also be disposed in the hollow interior 76 of the stem 34. The spline shaft 74 is prevented from rotation within the hollow interior of the stem 34 by a pin 80. The pin 80 allows the spline shaft 74 to reciprocate (vertically in FIGS. 6 and 7) within the hollow interior 76 of the stem 34 without rotation about the stem axis 36. The spline shaft 74 comprises a plurality of splines 82 extending around an intermediate section 84 of the spline shaft. The intermediate section 84 of the spline shaft 74 may be tapered. A distal end 86 of the spline shaft 74 may extend away from the intermediate section 84 along a center axis of the spline shaft.

In the stem cavity 32, a spline bushing 88 is provided. The spline bushing 88 has an interior with a plurality of splines 90 and an exterior with a tab 92 which cooperates with the stem cavity 32 to prevent the spline bushing from rotation within the stem cavity. The splines 90 of the spline bushing 88 may cooperate with the splines 82 of the spline shaft 74 to allow releasably interlocking of the bushing 88 and shaft 74 together. The splines 90 of the spline bushing 88 may also be tapered to facilitate releasably interlocking of the bushing and shaft together. The stem cavity 32 may have an interior geometry to allow the spline bushing 88 to be inserted therein and constrained from movement. For instance, the spline bushing 88 may have features, including its tab 92, which interlock with the body 22 in the stem cavity 32 so that the body and spline bushing may become integral, moving together as a unit relative to the stem when disengaged from the spline shaft.

The spline bushing 88 has a center axis, which may be co-linearly aligned with the center axis of the spline shaft 74. While the drawings show the center axis of the spline shaft 74 co-linearly aligned with the stem center axis 36, the spline shaft center axis may also be offset from the stem center axis. The spline shaft 74 may be movable along the spline shaft center axis toward the spline bushing 88 to engage with the spline bushing in the fixed position, and the spline shaft may be movable along the spline shaft center axis away from the spline bushing to disengage from the spline bushing in the swivel position. In the swivel position, the spline shaft 74 is spaced from the spline bushing 88 so as to allow free rotation of the stem 34 relative to the body 22 about the stem axis 36. In the fixed position, the spline shaft 74 interlocks with the spline bushing 88 to prevent rotation of the stem 74 relative to the body 22 about the stem axis 36. While the drawings show the spline shaft 74 moving relative to the spline bushing 88, the arrangement may be reversed. For instance, in an alternate configuration, the spline bushing may be movable along the spline bushing center axis to engage with and disengage from the spline shaft. By way of example, this configuration may be employed where the stem is integral with the spline bushing and the spline shaft is integral with the body in the stem cavity.

The leading brake lever 38 may have a spline shaft stop 94. When the leading brake lever is in the unlocked position, the spline shaft stop 94 may engage the distal end 86 of the spline shaft, maintaining the spline shaft 74 in a spaced-apart relationship with the spline bushing 88 and allowing the stem 34 and spline shaft to rotate together relative to the body 22 about the swivel axis (i.e., the swivel position). When the leading brake lever 38 is moved downward (for instance, clockwise in FIG. 6), the spline shaft stop 94 may disengage from the distal end 86 of the spline shaft 74. The spring 78 housed in the hollow interior 76 of the stem 34 may force the spline shaft 74 downward (FIG. 6) to engage the spline bushing 88 (i.e., the fixed position). The cooperating tapered features of the male and female splines 82,90 may facilitate engagement of the spline shaft 74 with the spline bushing 88 and provide good locking properties with little play. With the leading brake lever 38 in the locked position, and the spline shaft 74 and spline bushing 88 interlocked together in the fixed position, the stem 34 is locked with the body 22 and rotation of the stem relative to the body about the stem axis 36 is prevented.

To reposition the spline shaft 74 and spline bushing 88 to the swivel position, the leading brake lever 38 may be moved upward (for instance clockwise in FIG. 7) such that the spline shaft stop 94 may engage the distal end 86 of the spline shaft 74 and forces the spline shaft upward, releasing the spline shaft from the spline bushing 88. Upward motion (for instance clockwise in FIG. 7) of the leading brake lever 38 acts against the pressure of the spring 78. With the finger 60 of the leading brake lever engaging its upward detent 62, the spline shaft 74 is moved upward so that the spline shaft spaced away from the spline bushing 88 (i.e., the swivel position).

While the drawings show a leading brake lever that is movable to engage the spline shaft and the wheel, the brake lever may operate solely to prevent rotation of the wheels, and a separate lever may be provided actuate the swivel or stem lock. To lighten the weight of the body, the body may be formed with interior radial spokes 96 in the stem cavity 32. The stem bearing 70 may be mounted on upper flat faces on the spokes 96 in the stem cavity. Additionally, the brake levers 38,40 may be formed with clearance grooves 98 to allow relative motion of the brake levers relative to pivot pins 44,58 and the axle 42 within the body 22.

The embodiments were chosen and described in order to best explain the principles and their application to thereby enable others skilled in the art to best utilize the various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A caster comprising:
    a body;
    a wheel operatively rotatably connected to the body and being rotatable about a wheel axis;
    a wheel lock having a wheel teeth lock movable between a locked position in which the wheel teeth lock engages the wheel so the wheel is prevented from rotation about the wheel axis and a unlocked position in which the wheel teeth lock disengages from the wheel so the wheel is rotatable about the wheel axis;
    a stem operatively connected to the body and being rotatable about a stem axis, the stem axis being perpendicular to the wheel axis; and
    a stem lock having an interlocking spline shaft and spline bushing, the spline shaft having a longitudinal axis coaxial with the stem axis, the spline bushing having a center axis aligned with the spline shaft longitudinal axis, the stem lock movable between a fixed position in which the spline shaft and spline bushing are engaged so that the stem is prevented from rotation about the stem axis, and a swivel position in which the spline shaft and spline bushing are disengaged so that the stem is rotatable about the stem axis;

wherein when the stem lock is in the swivel position, the spline shaft is spaced from the spline bushing along the spline shaft longitudinal axis, and when the stem lock is in the fixed position, the spline shaft engages the spline bushing along the spline shaft longitudinal axis;

wherein the wheel lock further comprises a lever, the lever being operatively connected with the wheel teeth lock to move the wheel teeth lock between the unlocked position and the locked position, the lever having a length with opposite first and second ends, the lever first end having a pivot connection with the body and the lever second end extending from body and configured to be actuated by a user to move the wheel teeth lock between the locked position and the unlocked position, the lever having a spline shaft stop intermediate of the first and second ends;

wherein when the lever moves the wheel teeth lock to the unlocked position, the wheel lock lever spline shaft stop engages the stem lock spline shaft to maintain the stem lock in the swivel position, and when the lever moves the wheel teeth lock to the locked position, the wheel lock lever spline shaft stop disengages from the stem lock spline shaft allowing the stem lock to move to the fixed position.

2. The caster of claim 1 wherein the spline shaft is operatively connected with the stem.

3. The caster of claim 1 wherein the spline bushing is located in a cavity in the body.

4. The caster of claim 3 wherein the spline bushing has a tab that cooperates with the cavity to prevent rotation of the bushing in the cavity.

5. The caster of claim 1 wherein the spline shaft and spline bushing have cooperating tapered features.

6. The caster of claim 1 further comprising a spring configured to urge the stem lock to the fixed position.

* * * * *